United States Patent
Albrecht (10) Patent No.: US 10,863,479 B2
(45) Date of Patent: Dec. 8, 2020

(54) EXCHANGING GROUP COMMUNICATIONS OVER FAMILY RADIO SERVICE (FRS) CHANNELS

(71) Applicant: Orion Labs, San Francisco, CA (US)

(72) Inventor: Gregory Albrecht, San Francisco, CA (US)

(73) Assignee: Orion Labs, Inc., San Francisco, CA (US)

(*) Notice: Subject to any disclaimer, the term of this patent is extended or adjusted under 35 U.S.C. 154(b) by 0 days.

(21) Appl. No.: 16/198,144

(22) Filed: Nov. 21, 2018

(65) Prior Publication Data

US 2019/0166579 A1 May 30, 2019

Related U.S. Application Data (60) Provisional application No. 62/592,727, filed on Nov. 30, 2017.

(51) Int. Cl.
*H04W 72/00* (2009.01)
*H04W 4/08* (2009.01)
*H04W 4/10* (2009.01)

(52) U.S. Cl.
CPC .......... *H04W 72/005* (2013.01); *H04W 4/08* (2013.01); *H04W 4/10* (2013.01)

(58) Field of Classification Search
CPC ........ H04W 72/005; H04W 4/08; H04W 4/10
See application file for complete search history.

(56) References Cited

U.S. PATENT DOCUMENTS

| 7,158,792 B1* | 1/2007 | Cook | H04W 72/06 455/450 |
| 2006/0217166 A1* | 9/2006 | Swanson | H04B 1/3822 455/701 |
| 2009/0161626 A1* | 6/2009 | Crawford | H04W 36/14 370/331 |
| 2017/0164165 A1* | 6/2017 | Negalaguli | H04W 4/10 |

* cited by examiner

*Primary Examiner* — Ankur Jain (57) ABSTRACT

A group communication service establishes a communication group comprising a plurality of user nodes configured to receive and transmit user node communications between group communication members over a wireless network. A Family Radio Service (FRS) channel configuration is embedded into each of the plurality of user nodes within the communication group which identifies a designated FRS channel to exchange user node communications. The group communication service detects a trigger to activate an FRS mode and transfers an instruction to each of the plurality of user nodes to identify the FRS channel for the user node communications based on the FRS channel configuration. In response to transferring the instruction to each of the plurality of user nodes, the group communication service receives user node communications from and distributes user node communications to members of the communication group over the designated FRS channel.

20 Claims, 6 Drawing Sheets

EXCHANGING GROUP COMMUNICATIONS OVER FAMILY RADIO SERVICE (FRS) CHANNELS

RELATED APPLICATIONS

This claims priority to and benefit from U.S. Provisional Patent Application Ser. No. 62/592,727, filed on Nov. 30, 2017, titled "Exchanging Group Communications over Family Radio Service (FRS) Channels," which is expressly incorporated by reference herein.

TECHNICAL BACKGROUND

Group management systems facilitate secure communications between multiple user nodes in a distributed communication environment. Communications among members of a defined group can be enabled using distributed end user devices operating in the networked user nodes, where multiple user nodes each include an intermediate communication device that establishes a communication channel with another intermediate communication device in another user node. The intermediate communication devices (e.g., cellphones, smartphones, laptop computers, tablets and others) are linked to a communication network and the group management system, which implements communications between user devices (via a communication application in each intermediate communication device) in the defined group of user nodes.

The Family Radio Service (FRS) has become commonplace to exchange personal user communications. The FRS uses channelized frequencies around 462 and 467 MHz in the Ultra High Frequency (UHF) band. While users may exchange group communications using various wireless networks when located within the coverage range of the wireless network, members of a group may move to locations not adequately covered by a wireless network. Users may not be aware when one or more other members in the group are moving outside of the coverage area and may not be able to exchange group communications. Furthermore, users may belong to multiple groups which may not be able to determine an FRS channel for a group but another FRS channel for a second group. A variety of solutions have been tried with respect to simplifying the group communications when wireless coverage is inadequate. However, current solutions do not allow users to exchange group communications using a group designated FRS channel based on an FRS channel configuration.

SUMMARY

Technology is disclosed herein that improves the use of the Family Radio Service (FRS) in a group communication system. In various implementations, a group communication system establishes a communication group comprising a plurality of user nodes configured to receive and transmit user node communications between group communication members. An FRS channel configuration is then embedded into each of the plurality of user nodes within the communication group. The FRS channel configuration identifies a designated FRS channel to exchange user node communications. The group communication service then detects a trigger to activate an FRS mode and transfers an instruction to each of the plurality of user nodes to identify the FRS channel for the user node communications based on the FRS channel configuration. In response to transferring the instruction to each of the plurality of user nodes to identify the FRS channel, the group communication service receives user node communications from and distributes user node communications to members of the communication group over the designated FRS channel.

In some implementations, the group communication service detects the trigger to activate the FRS mode by detecting a signal strength below a signal strength threshold in a mobile network by one or more of the plurality of user nodes. In other implementations, the group communication service detects the trigger to activate the FRS mode by detecting an activation of an FRS switch turning the FRS mode on. The FRS channel configuration may be embedded into a mobile phone. The FRS channel configuration may also be embedded into a Push To Talk (PTT) device. In some examples, the total number of FRS channels used for the FRS channel configuration may be modified based on a Continuous Tone-Coded Squelch System (CTCSS). Each of the plurality of user nodes may also be embedded with a different FRS channel configuration for each communication group based on a group Internet Protocol (IP) address and wherein the instruction to each of the plurality of user nodes further includes the group IP address.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
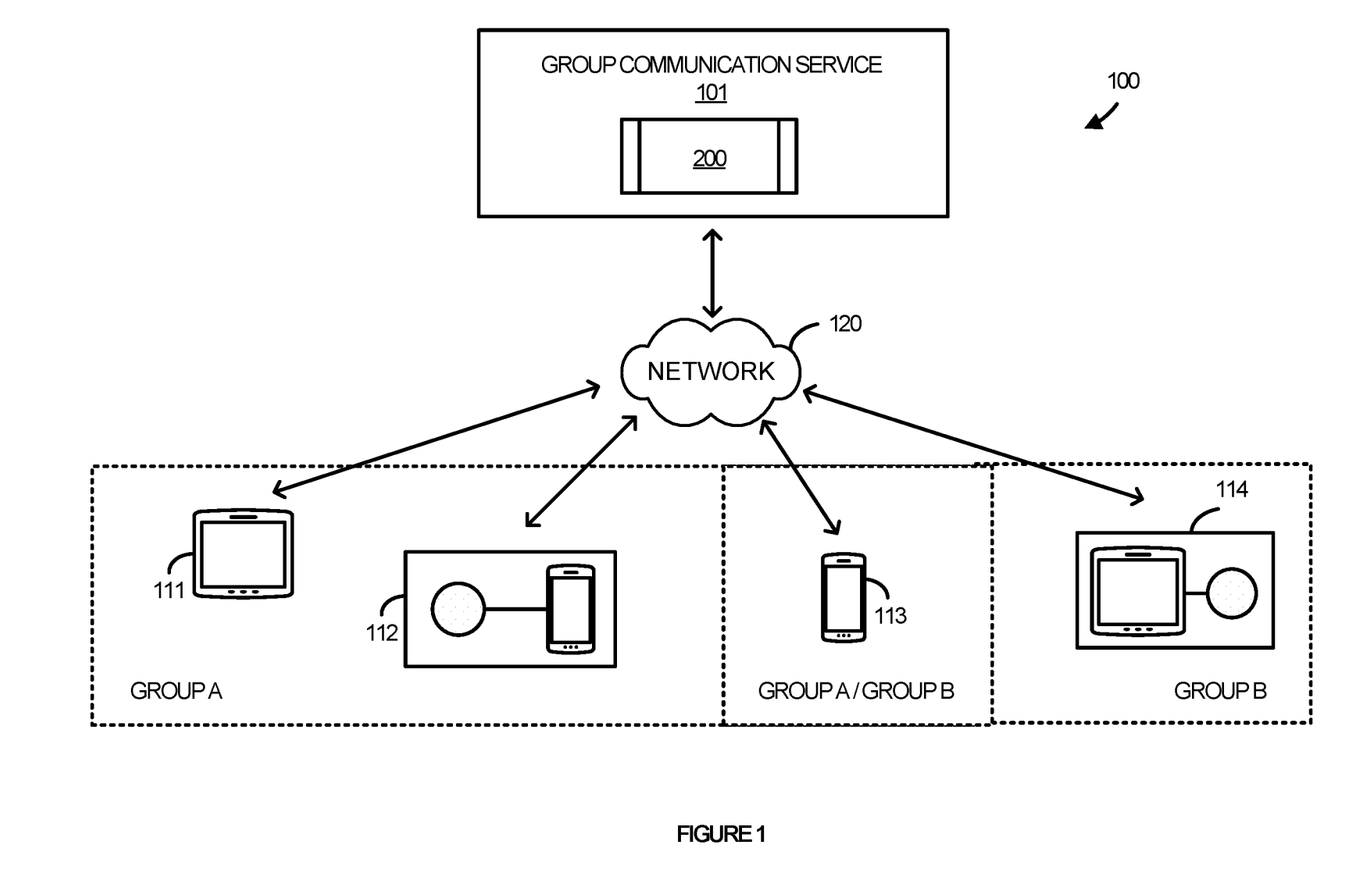
FIG. 1 illustrates an operational architecture for implementing embodiments of enhanced use of Family Radio Service (FRS) in a group communication system.
Figure 2:
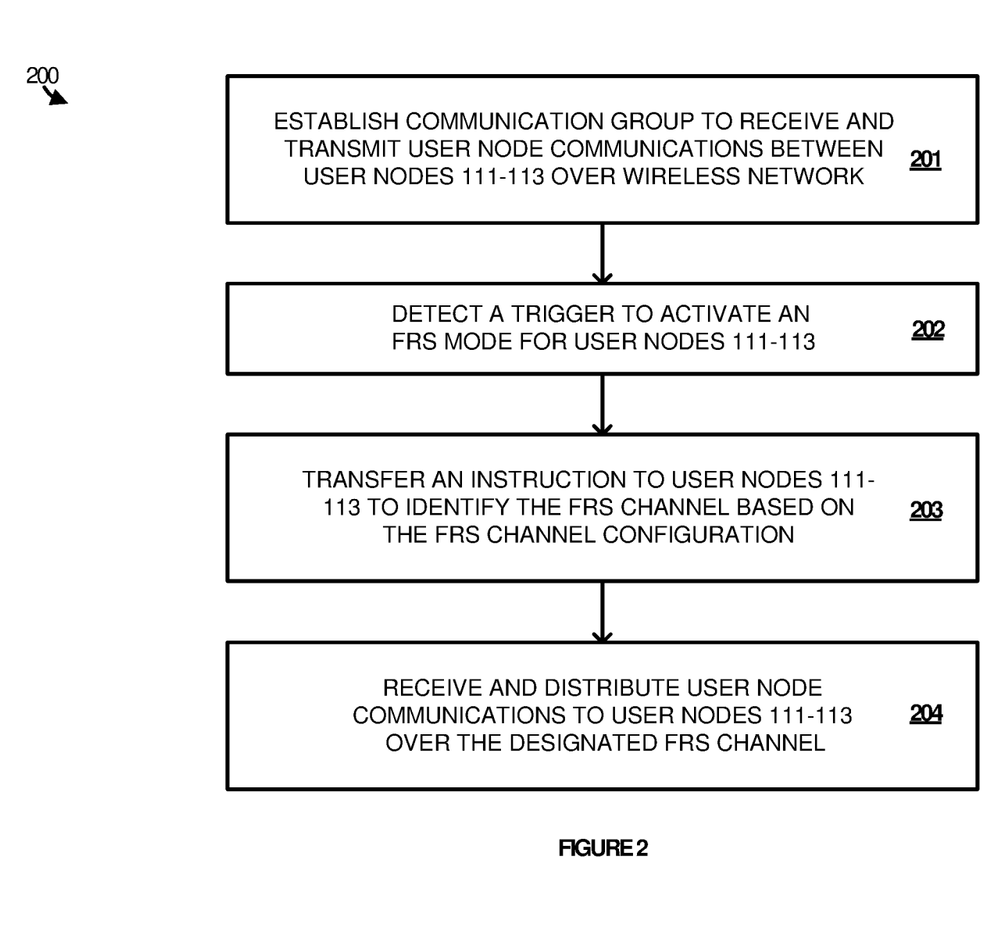
FIG. 2 illustrates a transcribing process employed by a group communication service in embodiments of enhanced use of FRS in a group communication system.

Technology is disclosed herein that enhances the use of Family Radio Service (FRS) in a group communication system. FIG. 1 illustrates operational architecture 100 for implementing the use of FRS for group communications in an embodiment. Operational architecture 100 includes group communication service 101, member operated user nodes represented by user nodes 111-114, and mobile network 120. User nodes 111-113 are included in Group A, and user nodes 113-114 are included in Group B. User nodes 111-114 are connected to group communication service 101 over a network 120. Group communication service 101 also includes an FRS communicating process 200.

In a brief example, group communication service 101 receives user node communications from and distributes user node communications to members of a communication group. The communication group members may exchange group communications using the plurality of user nodes 111-114. These communication group members may be, for instance, a group of emergency responders communicating about a natural disaster, or any other type of organization that may be connected for group communications.

Figure 6:
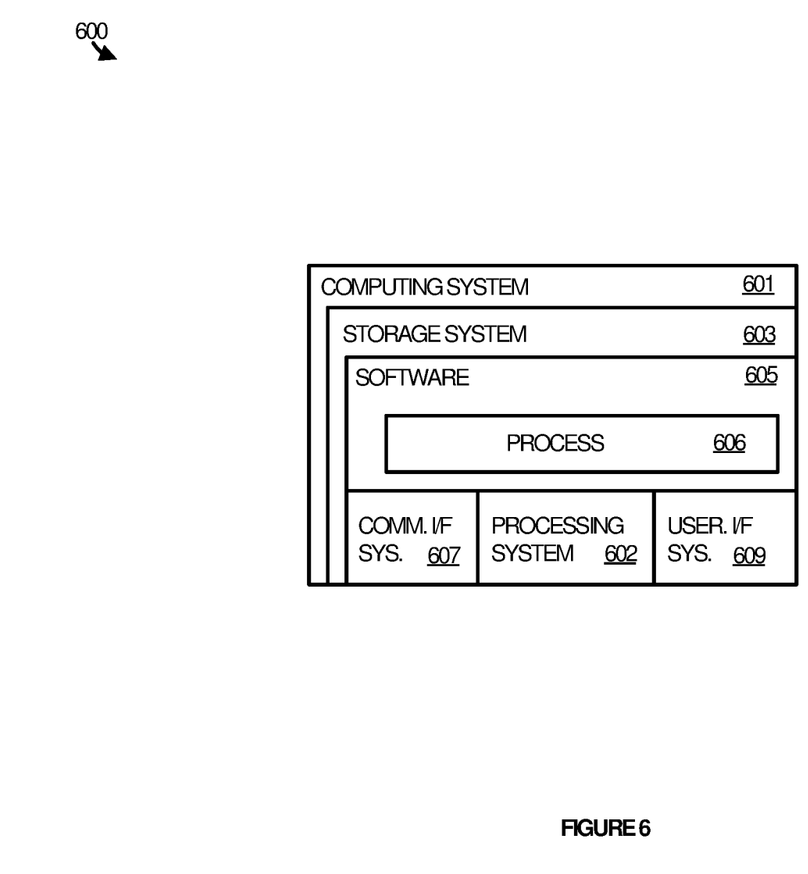
FIG. 6 illustrates a computing system suitable for implementing the group communication technology disclosed herein, including any of the architectures, processes, operational scenarios, and operational sequences illustrated in the Figures and discussed below in the Technical Disclosure.

Group communication service 101 provides an organizational presence to distribute communications between user nodes 111-114 in groups and external media services. For example, members of a group may login to group communication service 101 to receive and transmit group communications. Group communication service 101 may be implemented on one or more computing systems, of which computing system 600 in FIG. 6 is representative. The network 120 may be a wireless network for exchanging group communications between group communication service 101 and user nodes 111-114. For example, the network 120 may comprise a cellular network, a Wireless Fidelity (Wi-Fi) connection, a Bluetooth connection, or some other communication network, including combinations, improvements, or variations thereof.

The user nodes are then associated with one or more communication groups and share communications through group communication service 101. Group communication service 101 will then be used to receive and distribute the communications to the group members. For example, user nodes 111-113 share group communications in Group A while user nodes 113-114 share group communications in Group B. Group communication service 101 may be hosted in a public cloud environment, a private cloud environment, on-premises, via remotely deployable infrastructure, or in some other manner. Examples of user nodes 111-114 include customized electronic end user device (e.g., a wearable end user device that operates as a push-to-talk (PTT) device) that is communicatively linked to an intermediate communication device (e.g., a smartphone that receives communications from the end user device) using a link.

A given user node may become associated with a communication group during the setup and configuration process of user nodes 111-114. User nodes 111-114 can be configured to allow a member of the group to audibly communicate with one or more members of a group and/or group communication service 101 without having to provide user input to an intermediate communication device, such as a mobile phone. The user nodes may be required to provide authentication and/or other information to link to their respective intermediate communication devices, after which a member can utilize a linked end user device to communicate directly with other members of a group.

Each of user nodes 111-114 also includes an embedded FRS channel configuration that is used to identify a designated FRS channel to exchange user node communications. The FRS channel configuration may be embedded in a mobile phone component of each of user nodes 111-114. The FRS channel configuration may also be embedded in a Push to Talk (PTT) device or some other user node component capable of transmitting and receiving FRS signaling and communications.

The FRS channel configuration may be embedded based on a communication group identifier. For example, each of user nodes 111-113 may be embedded with an FRS channel configuration for Group A and each of user nodes 113-114 may be embedded with an FRS channel configuration for Group B. It should be noted that user node 113 may be embedded with more than one FRS channel configuration and therefore, may be capable of communicating on two designated channels.

Group communication service 101 employs an FRS communicating process 200 in various implementations, to exchange group communications over the FRS spectrum. FRS communicating process 200 may be implemented in program instructions in the context of any of the software applications, modules, components, or other such program elements that comprise group communication service 101. The program instructions direct the underlying physical or virtual computing system or systems that provide group communication service 101 to operate as follows.

In operation, group communication service 101 establishes a communication group comprising user nodes 111-113 configured to receive and transmit user node communications between group communication members over the wireless network (step 201). Each of the plurality of user nodes 111-113 is embedded with an FRS channel configuration which identifies a designated FRS channel to exchange user node communications. The embedded FRS channel configuration may be included in each of user nodes 111-113 upon setting up the communication Group A. The embedded FRS channel configuration may also be communicated to each of user nodes 111-113 from group communication service 101 via a secure communication channel established between a user node and group communication service 101.

In some implementations, the total number of FRS channels used in the FRS channel configuration may be modified based on a Continuous Tone-Coded Squelch System (CTCSS). CTCSS may be used to eliminate users that may be listening in on the FRS channel Since many FRS channels are not private channels, other users not within the communication group may be able to determine the FRS channel used by the user nodes and listen in to the group communications being exchanged using the FRS channel. CTCSS adds a low frequency audio tone to the voice being transmitted on the FRS channel which in effect may mute the audio to user nodes not using the same CTCSS tone or no CTCSS tone at all on the same frequency. In other implementations, each of user nodes 111-113 may be embedded with a different FRS channel configuration for each communication group based on a group Internet Protocol (IP) address and wherein the instruction to each of the plurality of user nodes further includes the group IP address.

Next, group communication service 101 detects a trigger to activate an FRS mode (step 202). Group communication service 101 may detect the trigger to activate the FRS mode by detecting a signal strength below a signal strength threshold in the wireless network by one or more of the plurality of user nodes. The signal strength may fall below a signal strength threshold as a result of moving to a location not adequately covered by wireless services provided by the wireless network. In other implementations, the group communication service detects the trigger to activate the FRS mode by detecting an activation of an FRS switch turning the FRS mode on.

At this point, group communication service 101 has detected a trigger to activate an FRS mode for user nodes 111-113. Group communication service 101 then transfers an instruction to each of the plurality of user nodes 111-113 to identify the FRS channel for the user node communications based on the FRS channel configuration (step 203). In a final operation, group communication service 101 receives user node communications from and distributes user node communications to members of the communication group over the designated FRS channel (204).

Advantageously, user nodes 111-113 initially exchanging group communications using a wireless network may then exchange group communications over an FRS channel without the need for a user node to indicate to each of the other user nodes 111-113 to switch communications to an FRS channel. This may be additionally useful when some of user nodes 111-113 are no longer located within the coverage range of the wireless network. This may occur when members of a group move to locations not adequately covered by a wireless network. Additionally, the users may not be aware when one or more other members in the group is moving or has moved outside of the coverage area. These members who have moved outside of the coverage area may no longer be able to exchange group communications.

Furthermore, users may belong to multiple groups which may not be able to determine which FRS channel should be used for each communication group. Therefore, a technical effect that may be appreciated from the present discussion is the increased efficiency and effectiveness in determining an allocated FRS channel for a group communication session when transitioning users from exchanging group communications over a wireless network to exchanging group communications using the FRS spectrum when user nodes in the group belong to more than one communication group.

Figure 3:
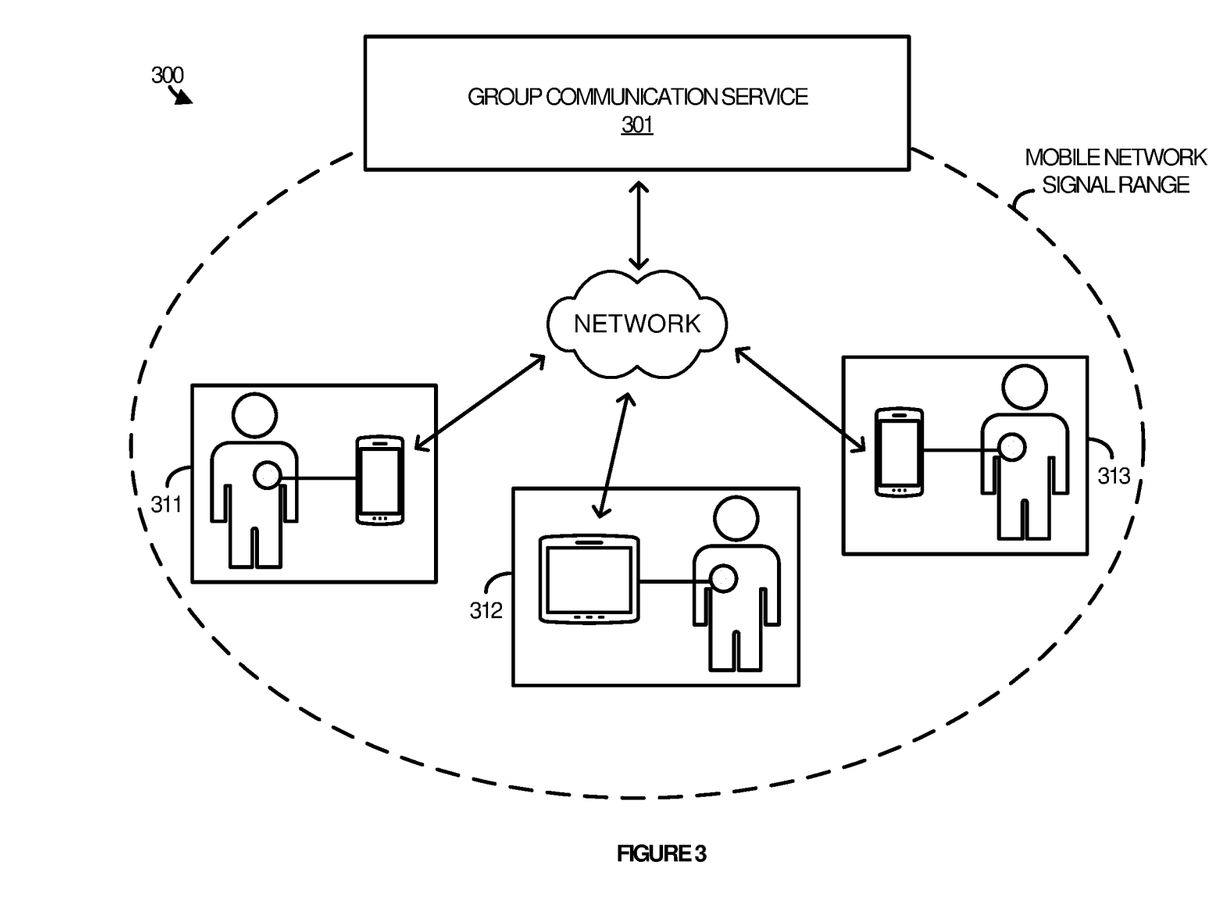
FIG. 3 illustrates a communicating process employed by a user node in embodiments of enhanced use of FRS in a group communication system.

FIG. 3 illustrates an operational scenario that may occur with respect to the operational architecture illustrated in FIG. 1, as group communication service 301, a mobile network, and user nodes 311-313 in Group A employing FRS communicating process 200 respectively. Each of user nodes 311-313 includes a user, a mobile device, and a PTT device which is worn by each of the users. As illustrated by the dashed circle in FIG. 3, each of user nodes 311-313 is located within the mobile network signal range.

During the initial setup of the group communication for Group A, each of user nodes 311-313 is embedded with an FRS channel configuration. It should be noted that each of user nodes 311-313 may belong to additional communication groups and therefore may include additional FRS channel configurations depending on which communication group the user node is exchanging group communications with. User nodes 311-313 interface with group communication service 301 to setup a group communication session. The group communication session may be setup for members of a Group A using user nodes 311-313. For example, Group A may include Emergency Medical Service (EMS) response personnel, judicial staff, law-enforcement and correction officers, or the like. The communications may be used to exchange information between members of Group A using an end-user mobile device, such as the PTT device, that may interact with an intermediate mobile device, such as a smartphone.

Group communication service 301 sets up the group communications between members of the EMS team and receives user node communications from and distributes user node communications to members of the EMS team. Assuming the EMS team is called to an event, the EMS team members use user nodes 311-313 to exchange audio messages. For example, the EMS team may arrive at a natural disaster and exchange initial observations between members of the EMS team using a wearable PTT device that is communicatively linked to a smartphone that receives communications from the PTT device using a link.

Figure 4:
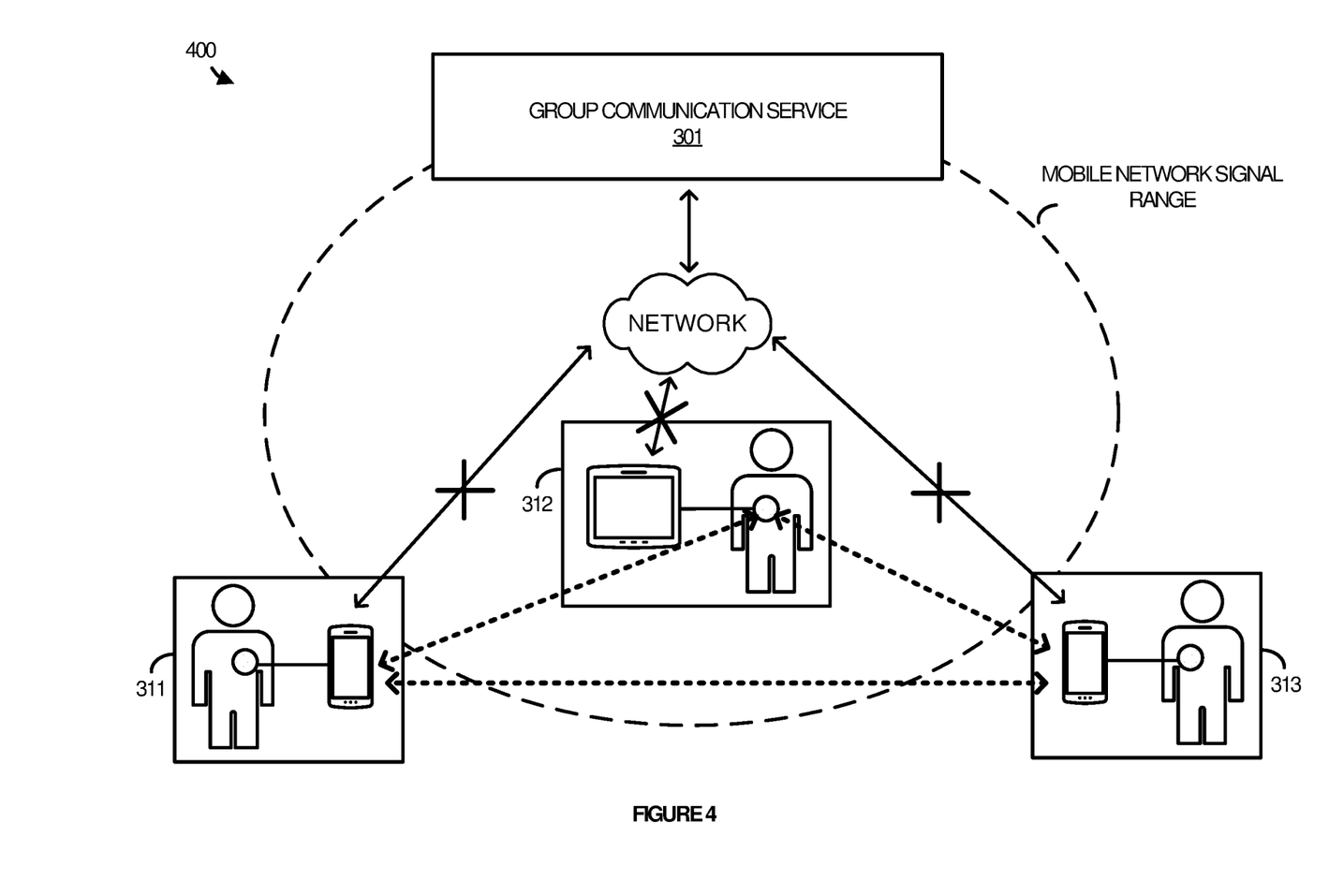
FIG. 4 illustrates an operational scenario in an embodiment of enhanced use of FRS in a group communication system.

Referring to FIG. 4, user nodes 311-313 representing the EMS team members may begin to move away from the mobile network signal range. More specifically, user node 311 and user node 313 move outside of the mobile network signal range. As user node 311 and user node 313 begin to move outside of the mobile network signal range, group communication service 301 may determine that the signal strength is too low and instruct user nodes 311-313 to exchange group communications over a designated FRS channel as determined by the embedded FRS channel configurations.

As illustrated by the X over the communication links from the mobile network to user nodes 311-313, user nodes 311-313 no longer exchange group communications over the mobile network. Instead, user nodes 311-313 exchange group communications using the FRS channel as indicated by the dotted-lines between each of user nodes 311-313. It should be noted that user nodes 311-313 may each communicate using the FRS channel from the mobile phone or from the PTT device. For example, user node 311 and user node 313 each exchange group communications over the designated FRS channel using a mobile phone. However, user node 312 exchanges group communications over the designated FRS channel using the wearable PTT device.

Figure 5:
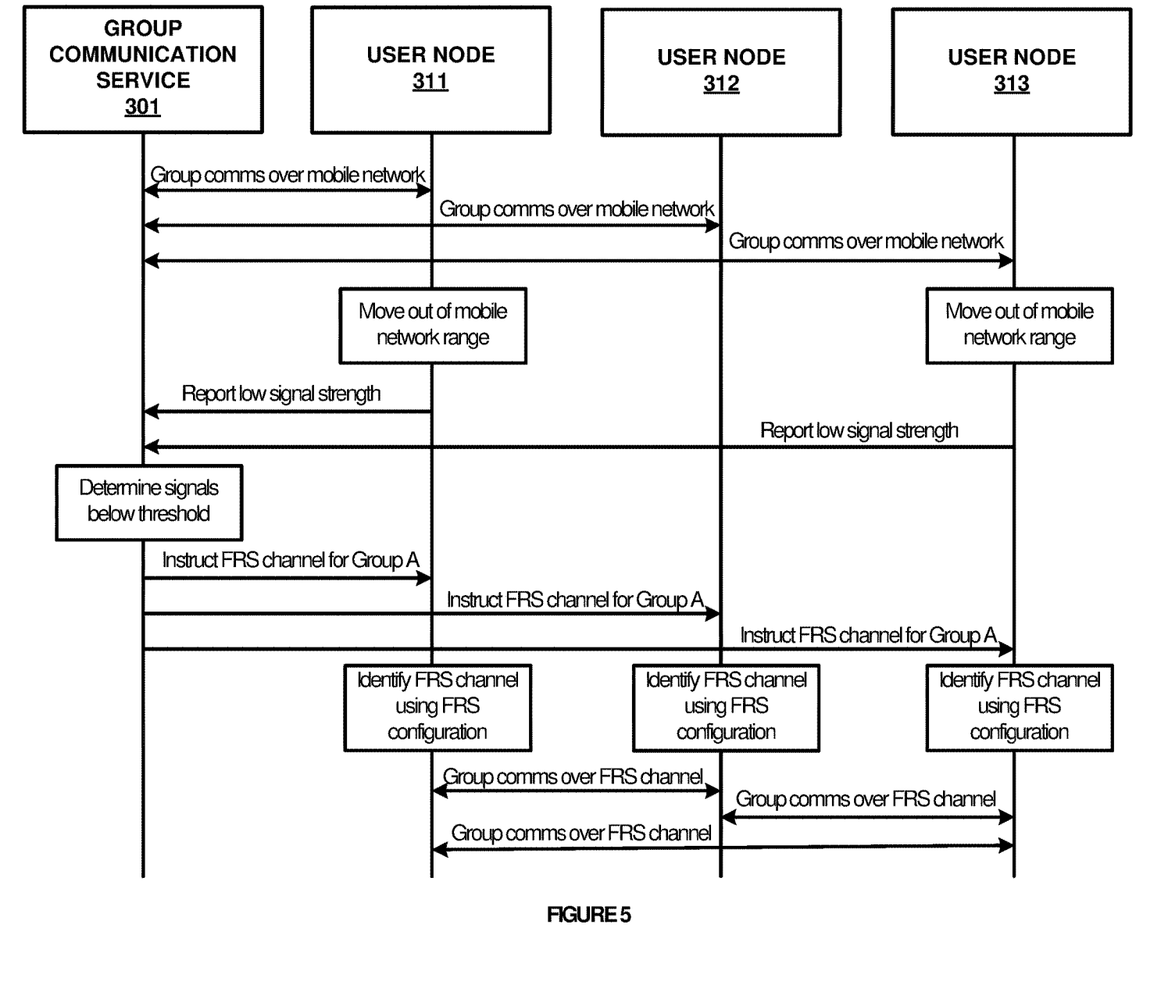
FIG. 5 illustrates an alternative operational scenario in an embodiment of enhanced use of FRS in a group communication system.

FIG. 5 illustrates a sequence diagram with respect to the operational architecture illustrated in FIG. 3 and FIG. 4. In operation, user nodes 311-313 interface with group communication service 301 to establish a communication group and exchanges user node communications between group communication members over the mobile network. User node 311 and user node 313 then begin to move outside the range of the mobile network. Group communication service 301 may detect that the mobile signal for user node 311 and user node 313 is low by receiving a low signal strength report for each of user node 311 and user node 313. Next, group communication service 301 determines that the signal strength is below a threshold signal strength value.

In response to determining that the signal strength is below the signal strength threshold, group communication service 301 may instruct each of the user nodes 311-313 in Group A to use a designated FRS channel to exchange group communications instead of the mobile network. Each of user nodes 311-313 would then identify the designated FRS channel based on the FRS channel configuration previously embedded in each of user nodes 311-313. In this scenario, the total number of FRS channels used in the FRS channel configuration is modified based on a CTCSS. Each of user nodes 311-313 then exchange group communications over the designated FRS channel for Group A.

Although not shown in FIG. 5, group communication service 301 may request an updated mobile network signal strength report from each of user nodes 311-313 after a timer has expired. If the updated signal strengths indicated in the signal strength reports is above the threshold signal strength, group communication service 301 may transfer an additional instruction to each of user nodes 311-313 to again exchange group communications for Group A using the mobile network.

FIG. 6 illustrates computing system 601, which is representative of any system or collection of systems in which the various applications, services, scenarios, and processes disclosed herein may be implemented. Examples of computing system 601 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609. Processing system 602 is operatively coupled with storage system 603, communication interface system 607, and user interface system 609 (optional).

Processing system 602 loads and executes software 605 from storage system 603. Software 605 includes process 606, which is representative of the processes discussed with respect to the preceding FIGS. 1-5, including FRS communicating process 200. When executed by processing system 602 to enhance the use of FRS in group communication services, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, graphical processing units, application specific processors, and logic devices, as well as any other type of processing device, combination, or variation.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing FRS communicating process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtual machine software, or other application software, in addition to or that include process 606. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system to enhance the use of FRS for communication group systems. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 609 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here.

User interface system 609 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), HTTPS, REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a group communication service, the method comprising:
    establishing a communication group comprising a plurality of user nodes configured to receive and transmit user node communications between group communication members over a wireless network, including embedding each of the plurality of user nodes with a Family Radio Service (FRS) channel configuration, specific to the communication group, which identifies a designated predefined FRS channel for members of the communication group to exchange user node communications;
    detecting a trigger to switch from a first wireless communication mode, in which user node communications are transmitted via a group communication computing system through a first wireless network, to an FRS mode, in which user node communications are transmitted directly between the plurality of user nodes via FRS transmission and not transmitted to the group communication computing system; and
    based on the trigger, transferring an instruction from the group communication computing system to each of the plurality of user nodes to implement the FRS mode and to identify the FRS channel for the user node communications based on the FRS channel configuration.

2. The method of claim 1 wherein detecting the trigger to activate the FRS mode comprises detecting a signal strength below a signal strength threshold in the wireless network by one or more of the plurality of user nodes.

3. The method of claim 1 wherein detecting the trigger to activate the FRS mode comprises detecting an activation of an FRS switch turning the FRS mode on.

4. The method of claim 1 wherein the FRS channel configuration is embedded into a mobile phone.

5. The method of claim 1 wherein the FRS channel configuration is embedded into a Push To Talk (PTT) device.

6. The method of claim 1 wherein the total number of FRS channels used in the FRS channel configuration is modified based on a Continuous Tone-Coded Squelch System (CTCSS).

7. The method of claim 1 wherein each of the plurality of user nodes is embedded with a different FRS channel configuration for each communication group based on a group Internet Protocol (IP) address and wherein the instruction to each of the plurality of user nodes further includes the group IP address.

8. A computing apparatus comprising:
    one or more computer readable storage media;
    a processing system operatively coupled with the one or more computer readable storage media; and
    program instructions for supporting group communication services stored on the one or more computer readable storage media that, when executed by the processing system, direct the processing system to:
    establish a communication group comprising a plurality of user nodes configured to receive and transmit user node communications between group communication members over a wireless network, including embedding each of the plurality of user nodes with a Family Radio Service (FRS) channel configuration, specific to the communication group, which identifies a predefined FRS channel for members of the communication group to exchange user node communications;

detect a trigger to switch from a first wireless communication mode, in which user node communications are transmitted via the processing system through a first wireless network, to an FRS mode, in which user node communications are transmitted directly between the plurality of user nodes via FRS transmission and not transmitted to processing system; and based on the trigger, transfer an instruction to each of the plurality of user nodes to implement the FRS mode and to identify the FRS channel for the user node communications based on the FRS channel configuration.

9. The computing apparatus of claim 8 wherein the processing system configured to detect the trigger to activate the FRS mode comprises the processing system configured to detect a signal strength below a signal strength threshold in the wireless network by one or more of the plurality of user nodes.

10. The computing apparatus of claim 9 wherein the program instructions further direct the processing system to:

after transferring the instruction to implement the FRS mode, determine whether the signal strength of the plurality of user nodes are above the signal strength threshold in the wireless network; and transmit a second instruction to each of the plurality of user nodes to switch from the FRS mode to the first wireless communication mode when the signal strength of the plurality of user nodes are above the signal strength threshold.

11. The computing apparatus of claim 8 wherein the processing system configured to detect the trigger to activate the FRS mode comprises the processing system configured to detect an activation of an FRS switch turning the FRS mode on.

12. The computing apparatus of claim 8 wherein the FRS channel configuration is embedded into a mobile phone configured to function as an intermediate communication device linking a Push to Talk (PTT) communication device to the wireless network.

13. The computing apparatus of claim 8 wherein the total number of FRS channels used in the FRS channel configuration is modified based on a Continuous Tone-Coded Squelch System (CTCSS).

14. The computing apparatus of claim 8 wherein:

each of the plurality of user nodes is embedded with a different FRS channel configuration with a different predefined FRS channel for each communication group; and the instruction to each of the plurality of user nodes further includes a group identifier indicating a corresponding predefined FRS channel.

15. A memory device storing instructions that, when executed, cause a processing system to:

establish a communication group comprising a plurality of user nodes configured to receive and transmit user node communications between group communication members over a wireless network, including embedding each of the plurality of user nodes with a Family Radio Service (FRS) channel configuration, specific to the communication group, which identifies a designated predefined FRS channel for members of the communication group to exchange user node communications;

detect a trigger to switch from a first wireless communication mode, in which user node communications are transmitted via a group communication computing system through a first wireless network, to an FRS mode, in which user node communications are transmitted directly between the plurality of user nodes via FRS transmission and not transmitted to the group communication computing system; and based on the trigger, transfer an instruction to each of the plurality of user nodes to implement the FRS mode and to identify the FRS channel for the user node communications based on the FRS channel configuration.

16. The memory device storing instructions of claim 15 wherein detecting the trigger to activate the FRS mode comprises detecting a signal strength below a signal strength threshold in the wireless network by one or more of the plurality of user nodes.

17. The memory device storing instructions of claim 15 wherein detecting the trigger to activate the FRS mode comprises detecting an activation of an FRS switch turning the FRS mode on.

18. The memory device storing instructions of claim 15 wherein the FRS channel configuration is embedded into a mobile phone.

19. The memory device storing instructions of claim 15 wherein the FRS channel configuration is embedded into a Push To Talk (PTT) device.

20. The memory device of claim 15, wherein the instructions further cause a processing system to modify the total number of FRS channels based on a Continuous Tone-Coded Squelch System (CTCSS).

* * * * *